(12) United States Patent
Crooks

(10) Patent No.: US 10,066,778 B2
(45) Date of Patent: Sep. 4, 2018

(54) STOP MECHANISM FOR A ROTARY DEVICE

(71) Applicant: PHILIPS LIGHTING HOLDING B.V., Eindhoven (NL)

(72) Inventor: Brandon Crooks, Fairhaven, MA (US)

(73) Assignee: PHILIPS LIGHTING HOLDINGB.V., Eindhoven (NL)

( * ) Notice: Subject to any disclaimer, the term of this patent is extended or adjusted under 35 U.S.C. 154(b) by 0 days.

(21) Appl. No.: 15/107,936

(22) PCT Filed: Jan. 6, 2015

(86) PCT No.: PCT/IB2015/050092
§ 371 (c)(1),
(2) Date: Jun. 24, 2016

(87) PCT Pub. No.: WO2015/101967
PCT Pub. Date: Jul. 9, 2015

(65) Prior Publication Data
US 2016/0327200 A1    Nov. 10, 2016

Related U.S. Application Data

(60) Provisional application No. 61/923,954, filed on Jan. 6, 2014.

(51) Int. Cl.
*G05G 5/06* (2006.01)
*F16M 11/08* (2006.01)
*F21V 21/04* (2006.01)
*F21V 21/14* (2006.01)

(52) U.S. Cl.
CPC ............. *F16M 11/08* (2013.01); *F21V 21/04* (2013.01); *F21V 21/14* (2013.01); *F16M 2200/021* (2013.01)

(58) Field of Classification Search
CPC .. F16M 11/08; F16M 2200/021; F21V 21/04; F21V 21/14
See application file for complete search history.

(56) References Cited

U.S. PATENT DOCUMENTS

| 4,919,387 | A  | 4/1990  | Sampson |
| 6,024,335 | A  | 2/2000  | Min |
| 6,082,878 | A  | 7/2000  | Doubek et al. |
| 7,832,889 | B1 | 11/2010 | Cogliano |
| 8,182,126 | B2 | 5/2012  | Wronski et al. |
| 8,267,558 | B1 | 9/2012  | Glater |
| 2007/0019418 | A1 | 1/2007 | Czech et al. |

FOREIGN PATENT DOCUMENTS

| CN | 202831803 U | 3/2013 |
| CN | 103388423 A | 11/2013 |
| EP | 0508142 A2 | 10/1992 |
| EP | 2574281 A1 | 4/2012 |
| JP | 04150384 A | 5/1992 |
| JP | 07240861 A | 9/1995 |

*Primary Examiner* — Vicky A Johnson

(57) ABSTRACT

A mechanical stop apparatus that permits more than 360 degrees rotation in a horizontal plane is disclosed. The apparatus includes a lifted tang (160) on the stationary portion (120) of the apparatus and a finger (150) on the rotating portion (110). During maximum rotation, the finger slides up onto the tang to attain a maximum rotation in excess of 360 degrees.

13 Claims, 3 Drawing Sheets

STOP MECHANISM FOR A ROTARY DEVICE

CROSS-REFERENCE TO PRIOR APPLICATIONS

This application is the U.S. National Phase application under 35 U.S.C. § 371 of International Application No. PCT/IB2015/050092, filed on Jan. 6, 2015, which claims the benefit of U.S. Patent Application No. 61/923,954, filed on Jan. 6, 2014. These applications are hereby incorporated by reference herein.

This application is related to a mechanical stop mechanism that permits more than 360 degrees rotation in a horizontal plane. Such a mechanism finds many uses in lighting fixtures, photography and optical equipment, toys, games and various electronic devices in which horizontal rotation needs to be limited to prevent damage to the device (e.g., to wires, connections, internal parts, etc.).

Previous prior art stop mechanisms use an obstruction in the arc of the rotation. Having an obstruction in the way stops the mechanism from rotating, but also removes several degrees from rotation. Some prior art devices have included mechanisms to permit rotation a few degrees in excess of 360 degrees. Typically, the attained rotation is less than 365 degrees.

The present invention permits rotation in excess of 365 degrees. In one embodiment, the invention comprises a spring finger located on a rotating portion of the apparatus and a tang located on a stationary portion. In use, the finger resides underneath the tang in a "0 degree" position. As the assembly is rotated about a horizontal axis, the finger slides on the stationary portion. As the degree of rotation approaches 360 degrees, the finger slides onto the tang, surpassing its initial starting position underneath the tang. Maximum rotation occurs when the finger eventually comes to a stop on the tang. In one embodiment, this stop is a tab on the tang that is perpendicular to the direction of travel of the finger. Increasing the length of the tang permits placement of the stop such that a device that travels many degrees beyond 360 degrees is attained.

The advantages, nature, and various additional features of the invention will appear more fully upon consideration of the illustrative embodiments to be described in detail in connection with the accompanying drawings wherein like reference numerals are used to identify like elements throughout the drawings.

It is to be understood that the figures and descriptions of the present invention described herein have been simplified to illustrate the elements that are relevant for a clear understanding of the present invention, while eliminating, for purposes of clarity only, many other elements. However, because these eliminated elements are well-known in the art, and because they do not facilitate a better understanding of the present invention, a discussion of such elements or the depiction of such elements is not provided herein. The disclosure herein is directed also to variations and modifications known to those skilled in the art.

It will be further understood that the present invention is illustrated and primarily described with regard to a specific implementation of a recessed light fixture. Examples of rotatable recessed light fixtures may be found in U.S. Pat. No. 6,082,878 entitled "Fully Rotatable Recessed Light Fixture with Movable Stop and Adjustable Length Bar Hanger," issued Jul. 4, 2000 to Doubek et al. and U.S. Pat. Appln. Pub. No 2007/0019418 entitled "Recessed fixture with hinged doors and rotatable lamp," dated Jan. 25, 2007; the contents of each of which is incorporated by reference, herein.

However, it would be appreciated that the present invention is not limited to light fixtures and may also be applicable to other types of rotational devices without altering the scope of the invention.

Figure 1:
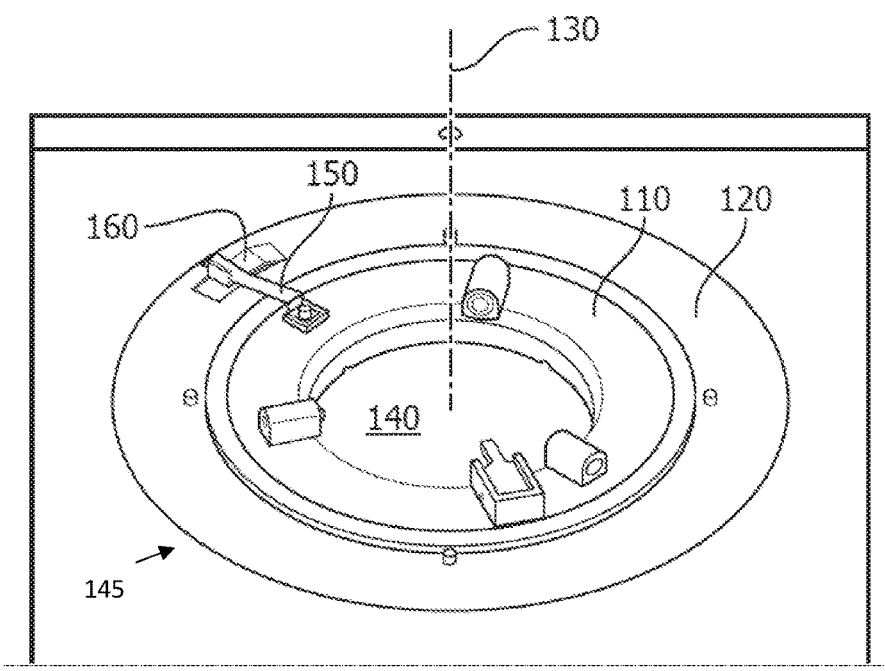
FIG. 1 illustrates a prospective view of an exemplary adjustable recessed light fixture component in accordance with the principles of the invention.

In the embodiment of the invention depicted in FIG. 1, a rotating component 110 is provided. Also shown is a second component 120 for which the component 110 rotates about, with an axis of rotation depicted as item 130. In this embodiment an opening 140 is provided to permit light from a recessed light fixture/apparatus 145 to exit. In this embodiment, the component 110 is layered between two surfaces (not shown) of the second component 120, the two surfaces being mechanically secured together. In this manner, component 110 is substantially fixed in a vertical direction; that is, substantially fixed in a direction parallel to the depicted axis of rotation 130.

As noted previously, the invention is not limited to recessed lighting fixtures/apparatus 145. Accordingly, an opening 140 in the center of both items 110 and 120 may not be required. In such situations, various alternative embodiments of the invention contemplate that item 110 may be fixed relative to item 120 by a rivet or similar fastening device in the center of its axis of rotation—thereby permitting the rotation about axis 130 and precluding any substantial motion in a vertical direction.

Figure 2:
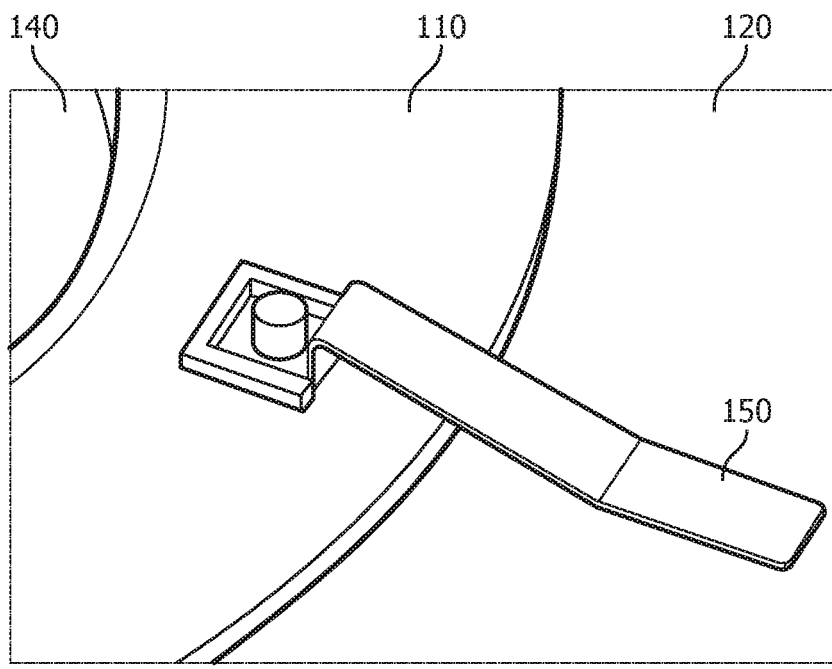
FIG. 2 illustrates a detailed prospective view of the deployment of the finger component of FIG. 1.

FIG. 1 further depicts a finger 150 mechanically attached to rotating component 120. This feature is also illustrated in FIG. 2. As illustrated in the embodiment depicted in FIG. 2, finger 150 is a fixed cantilever spring mechanically fastened to the rotating component 110. In this embodiment the finger 150 is biased to apply slight pressure down onto component 120. In alternative embodiments (not illustrated) the finger 150 may be formed of a rigid material, and the necessary biasing is created by employing one or more separate spring elements that are attached between the finger 150 and the rotating component 110.

Figure 3:
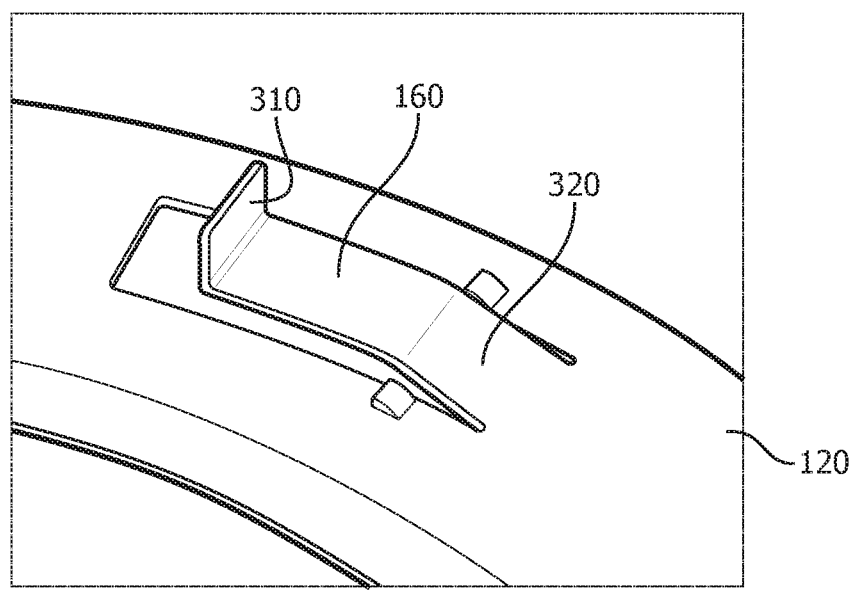
FIG. 3 illustrates a detailed prospective view of the deployment of the tang component of FIG. 1.

FIG. 1 also depicts a tang 160 which is also illustrated in further detail in FIG. 3. As illustrated in the embodiment depicted in FIG. 3, tang 160 is formed from the same piece of material as item 120. In addition, a stop element 310 is located at one end of the tang. The stop element is shown as being formed from the same piece of material as the tang 160 (and consequently of the same material as item 120). In alternative embodiments of the invention one or both of items 160 and 310 may be separate components that are formed separately from item 120, perhaps of different materials. In such embodiments tang 160 would subsequently be attached to item 120; and/or stop element would subsequently be attached to tang 160. In each of these various embodiments, the end of the tang opposite the stop element 310 forms a slight ramp 320 projecting slightly upward from the surface of item 120.

In use, the current invention permits a rotation in excess of 360 degrees of items 110 and 120 relative to each other.

Figure 4:
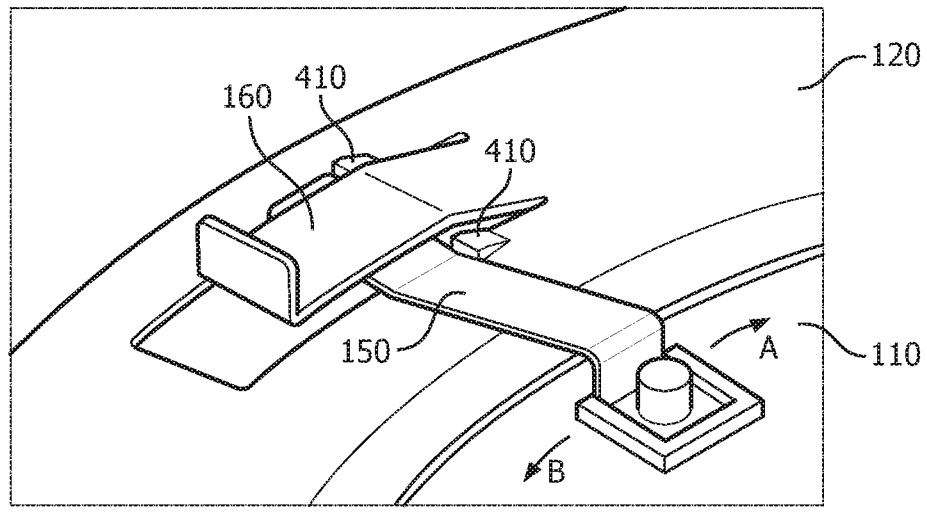
FIG. 4 illustrates a prospective view of the components of FIG. 1 at a "0 degree" rotational position.

FIG. 4 illustrates an initial position or 0 degree position. As illustrated, finger 150 is situated underneath tang 160 at the "0 degree" position. It should be noted that this "0 degree" designation is merely being used to define a position of maximum rotation in one direction. That is, as illustrated, any attempt to rotate item 110 in the Direction of Rotation A is prevented by depicted stop elements 410. In alternative embodiments of the invention, such stop elements 410 may be omitted as the shape of tang 160 at its juncture with item 120 can by itself prevent further turning in the Direction of Rotation A.

Rotation of item 110 relative to item 120 in Direction of Rotation B results in the finger 150 sliding on the surface of item 120. As noted above, embodiments of the invention contemplate finger 150 being biased to apply downward pressure. The pressure exerted can be utilized to partially restrict the turning operation. In this manner a desired position of item 110 relative to item 120, once attained, can be readily maintained. To that end, item 120 may have a textured surface and/or small groves can be provided on the surface of item 120 to create intermediate, discretely defined positions.

Figure 5:
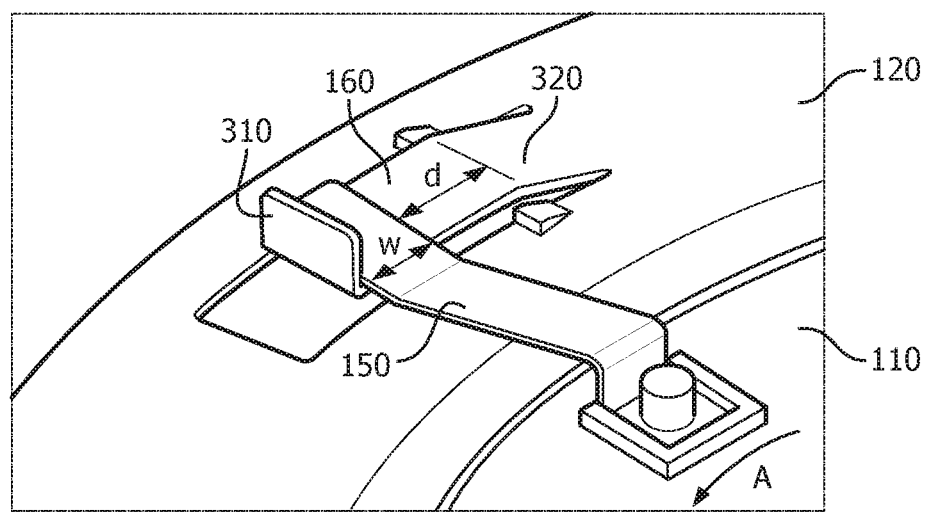
FIG. 5 illustrates a prospective view of the components of FIG. 1 at a rotational position in excess of 360 degrees.

As rotation continues in the Direction of Rotation B, the finger ultimately comes in proximity with end 320 of the tang 160. As illustrated in FIG. 5, further rotation of device 110 causes the finger 150 to then slide up onto the surface of the tang 160 where ultimately, the rotation is stopped as the finger 150 comes in contact with stop 310. In this manner, item 110 is capable of being rotated relative to item 120 in excess of 360 degrees—in particular, an additional angular rotation corresponding to the distance d depicted in FIG. 5. The maximum attainable degree of rotation is thus a function of the length of the tang 160 and the width, w, of the finger 150.

In additional embodiments of the invention, the tang 160 can be positioned on the rotating component 110 while the finger 150 is positioned on item 120 without loss of any of the above described functionality.

It is envisioned that the finger 150 and tang 160 components of the invention could be made of various different materials, perhaps to coincide with the apparatus in which they are being utilized. Such materials for use in constructing the tang 160 include, but are not limited to, various metals (e.g., sheet metal, cast aluminum) and various polymers. Such various materials are also useable in the finger 150 element as well as long as the resulting finger device attains the necessary downward bias required in embodiments of the invention in which one or more separate springs are not being utilized.

Other variations to the disclosed embodiments can be understood and effected by those skilled in the art in practicing the claimed invention, from a study of the drawings, the disclosure, and the appended claims.

While there has been shown, described, and pointed out fundamental and novel features of the present invention as applied to preferred embodiments thereof, it will be understood that various omissions and substitutions and changes in the apparatus described, in the form and details of the devices disclosed, and in their operation, may be made by those skilled in the art without departing from the spirit of the present invention.

It is expressly intended that all combinations of those elements that perform substantially the same function in substantially the same way to achieve the same results are within the scope of the invention. Substitutions of elements from one described embodiment to another are also fully intended and contemplated.

In the claims, the word "comprising" does not exclude other elements or steps, and the indefinite article "a" or "an" does not exclude a plurality. The mere fact that certain measures are recited in mutually different dependent claims does not indicate that a combination of these measured cannot be used to advantage.

The term "comprises", "comprising", "includes", "including", "as", "having", or any other variation thereof, are intended to cover non-exclusive inclusions. For example, a process, method, article or apparatus that comprises a list of elements is not necessarily limited to only those elements but may include other elements not expressly listed or inherent to such process, method, article, or apparatus. In addition, unless expressly stated to the contrary, the term "or" refers to an inclusive "or" and not to an exclusive "or". For example, a condition A or B is satisfied by any one of the following: A is true (or present) and B is false (or not present); A is false (or not present) and B is true (or present); and both A and B are true (or present).

Any reference signs in the claims should not be construed as limiting the scope of the claims or the invention described by the subject matter claimed.

The invention claimed is:

1. A mechanism for limiting the rotation about an axis of rotation of a rotating component relative to a second component, the rotating component being substantially fixed to the second component in a vertical direction parallel to the axis of rotation, the mechanism comprising:
   a finger device attached to the rotating component, wherein upon rotation of the rotating component, slides along an upper surface of the second component;
   a tang device attached to the second component; the tang device comprising a stop element and a ramp element; wherein the ramp element has a top surface distal from the upper surface of the second component and an opposing bottom surface, and wherein the stop element is located on the top surface of the ramp element;
   wherein, in an initial position of the rotating component, the finger device resides between the second component and the bottom surface of the ramp element;
   wherein upon rotation of the rotating component from said initial position the rotating component attains a maximum position of rotation when the finger device slides along the top surface of ramp element and stops rotating when the finger device abuts the stop element;
   wherein said maximum position of rotation relative to said initial position is in excess of 360 degrees.

2. The mechanism of claim 1 wherein the finger device maintains a downward bias against the upper surface of the second component.

3. The mechanism of claim 2 wherein the finger device is a fixed cantilever spring.

4. The mechanism of claim 1 wherein the tang device is formed from, and one-piece with, the second component.

5. The mechanism of claim 4 wherein the stop element and the ramp element are each one-piece with the tang device.

6. The mechanism of claim 5 wherein at least one of the stop element and the ramp element are formed separately from the tang device and subsequently attached to the tang device.

7. The mechanism of claim 1 wherein the tang device is formed separately from the second component and subsequently attached to the second component.

8. The mechanism of claim 7 wherein the stop element and the ramp element are each on-piece with the tang device.

9. The mechanism of claim 7 wherein at least one of the stop element and the ramp element are formed separately from the tang device and subsequently attached to the tang device.

10. The mechanism of claim 1 wherein said maximum position of rotation relative to said initial position is in excess of 363 degrees.

11. The mechanism of claim 1 wherein said maximum position of rotation relative to said initial position is in excess of 365 degrees.

12. A recessed lighting fixture containing at least one rotating element whose rotation is limited by the mechanism of claim 1.

13. An apparatus containing at least one rotating element whose rotation is limited by the mechanism of claim 1.

* * * * *